United States Patent [19]
Kato et al.

[11] 4,302,671
[45] Nov. 24, 1981

[54] RADIATION IMAGE READ-OUT DEVICE

[75] Inventors: Hisatoyo Kato; Seiji Matsumoto; Junji Miyahara, all of Minami-ashigara, Japan

[73] Assignee: Fuji Photo Film Co., Ltd., Kanagawa, Japan

[21] Appl. No.: 80,131

[22] Filed: Sep. 28, 1979

[30] Foreign Application Priority Data

Oct. 5, 1978 [JP] Japan .................. 53-122881

[51] Int. Cl.³ .............................. G01T 1/11
[52] U.S. Cl. ...................... 250/327.1; 250/337
[58] Field of Search ............ 250/327.1, 337, 484, 250/271, 458, 461 R, 459

[56] References Cited
U.S. PATENT DOCUMENTS 3,859,527  1/1975  Luckey .................... 250/337
3,975,637  8/1976  Ikedo et al. .............. 250/327.1

Primary Examiner—Davis L. Willis
Attorney, Agent, or Firm—Gerald J. Ferguson, Jr.; Joseph J. Baker

[57] ABSTRACT

A radiation image recorded in a stimulable phosphor is read out by stimulating the stimulable phosphor by use of stimulating rays such as visible light or infrared rays. Upon stimulated, the stimulable phosphor emits light which is detectable by a photosensor. The radiation image readout device includes a photosensor for detecting the light emitted by the phosphor, and a reflecting optical element like a mirror located between the phosphor and the photodetector for reflecting stimulating rays advancing between the phosphor and the photosensor toward the phosphor. The reflecting optical element has a very small size not to intercept the light emitted by the phosphor and detected by the photosensor as much as possible.

5 Claims, 5 Drawing Figures

RADIATION IMAGE READ-OUT DEVICE

BACKGROUND OF THE INVENTION

1. Field of the Invention

This invention relates to an image read-out device, and more particularly to a device for reading out an image recorded in a stimulable phosphor by impinging stimulating rays upon the stimulable phosphor and measuring the light emitted by stimulation.

2. Description of the Prior Art

When a stimulable phosphor is exposed to radiations like X-rays, α-rays, β-rays, γ-rays and ultraviolet rays, a part of the energy of the radiation is stored in the stimulable phosphor. Then, when the stimulable phosphor stored with the radiation energy is exposed to stimulating rays, the phosphor emits light. The amount of the emitted light depends upon the amount of the energy stored.

By utilizing the stimulability of the stimulable phosphor, it is possible to once record an X-ray image of a human body or the like on a sheet like stimulable phosphor plate and read out the recorded image by scanning the plate with a laser beam or the like which stimulates the phosphor and measuring the emitted light with a photosensor. In the prior art, it is known to provide an X-ray image producing apparatus which utilizes the stimulability of a stimulable phosphor as mentioned above to record on a photographic film the X-ray image by modulating a recording light beam scanning the film with the image information obtained by the photosensor which measures the amount of light emitted by the stimulable phosphor as disclosed, for instance, in U.S. Pat. No. 3,859,527.

In the above described apparatus, stimulating rays impinging upon the stimulable phosphor comes at right angle and the emitted light from the phosphor goes back along the optical axis of the stimulating rays, and a large semi-transparent mirror is located apart from a stimulable phosphor inclined at 45° with respect to the optical axis. Stimulating rays impinge upon the stimulable phosphor transmitting through the semi-transparent mirror. The light emitted by the stimulable phosphor by stimulation is reflected by the semi-transparent mirror and converged by a condenser lens and input into a photosensor.

The light emitted by the stimulable phosphor has no directivity and has small intensity. Therefore, the light collecting or converging efficiency must be maximized by enlarging the light receiving solid angle. When the light collecting efficiency is small, the S/N ratio is lowered and there is a possibility that the signal cannot be detected at all.

In the above described apparatus of the prior art, the light receiving solid angle cannot be sufficiently enlarged due to the structure of the apparatus and the light collecting efficiency is low.

SUMMARY OF THE INVENTION

In view of the above mentioned drawbacks of the prior art, it is the primary object of the present invention to provide a radiation image information read-out device which has high light collecting efficiency and accordingly a high S/N ratio.

The image read-out device in accordance with the present invention is characterized in that a photosensor is located close to the stimulable phosphor plate as much as possible, between the photosensor and the stimulable phosphor is provided a reflector having a size which is negligible with respect to the size of the light receiving face of the photosensor to direct the stimulating rays advancing between the photosensor and the stimulable phosphor toward the stimulable phosphor, and the light emitted by the stimulated phosphor is measured by the photosensor located close to the stimulable phosphor.

Since there is only provided a small reflector between the photosensor and the stimulable phosphor plate, it is possible to make the photosensor located very close to the phosphor plate. Hence, it is possible to enlarge the solid angle of the photosensor to receive light to be measured up to semi-spherical angle, namely $2\pi$ steradian, theoretically. Practically, it is possible to make the solid angle cover up to 90% of the semi-spherical angle.

As the reflector can be used a reflecting mirror or a prism, which is desired to be as small as possible not to intercept the light emitted by the stimulable phosphor. In other words, the solid angle of viewing the reflector from the light emitting point on the phosphor is desired to be as small as possible with respect to the solid angle of viewing the photosensor from the same point. Practically, the former angle is desired to be not more than 15% of the latter angle, more preferably not more than 10%. Further, the solid angle of viewing the reflector itself should preferably be as small as possible.

As the stimulating rays can be used a laser beam having high directivity. In order to have the laser beam scan the stimulable phosphor, the laser beam and/or the stimulable phosphor is moved in X-direction and Y-direction relatively to each other.

DESCRIPTION OF THE PREFERRED EMBODIMENTS

Figure 1:
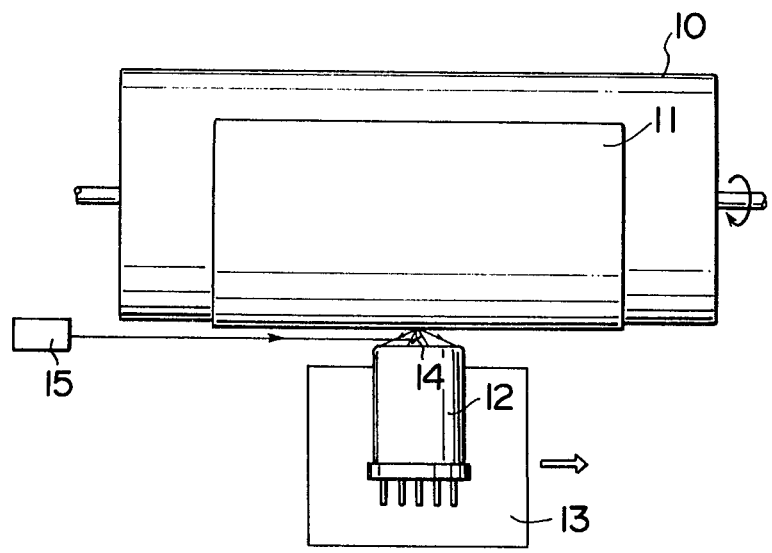
FIG. 1 is a front view showing an embodiment of the image read-out device in accordance with the present invention.

Now the invention will be described in detail with reference to accompanying drawings. FIG. 1 shows an embodiment of the present invention in which a rotary drum is used. A drum 10 is rotatably supported and a stimulable phosphor plate 11 is mounted thereon. The stimulable phosphor plate 11 is provided in advance with a latent X-ray image recorded thereon by means of an ordinary radiographic method.

The stimulable phosphor plate 11 is comprised of a flexible substrate and a stimulable phosphor layer applied thereon. When using a solid or hard substrate instead of the flexible substrate, the substrate is shaped to have the same curvature as that of the surface of the drum 10. Further, it is possible to use the drum itself as a substrate and apply the stimulable phosphor directly thereon to make whole the drum function as a stimulable phosphor plate.

At a position close to the phosphor plate 11 as much as possible is provided a photosensor 12. The photosensor 12 is secured to a read-out head 13 which is movable in the direction of the axis of the drum 10 as shown by an arrow in FIG. 1. The photosensor 12 is desired to have as large a light receiving area as possible and have as high an S/N ratio as possible so as to measure very minute light emission. For example, a head-on type photo-multiplier or a channel plate of photon amplification type is employed.

Between the drum 10 and the photosensor 12 is provided a reflection mirror 14 at an angle of about 45°. Stimulating rays are introduced into between the photosensor 12 and the drum 10 and reflected by the mirror 14 toward the stimulable phosphor plate 11. Since the stimulating rays should be introduced through the small space between the photosensor 12 and the drum 10, a laser beam having high directivity is preferred to be used as the stimulating rays. As the laser beam can be used light within the range covering infrared rays, near infrared rays and visible light. In this embodiment, a laser beam source 15 emitting red light is used. The mirror 14 has a very small size to make the solid angle of or effective amount of light received by the photosensor 12 as large as possible.

Now the operation of the device as described above will be described in detail. As the drum 10 rotates, the photosensor 12 and the mirror 14 are moved in the axial direction of the drum 10.

The laser beam having spectroscopic distribution ranging from 600 to 700 nm emitted by the laser beam source 15 advances along the surface of the drum 10 and is reflected by the mirror 14. The laser beam reflected by the mirror 14 impinges upon the stimulable phosphor plate 11 on the drum 10 and stimulates the stimulable phosphor layer.

By the stimulation, the stimulable phosphor emits light according to the energy stored therein. The emitted light therefore carries information regarding the X-ray image recorded thereon.

With the rotation of the drum 10 and the movement of the mirror 14 and the photosensor 12, the stimulable phosphor plate 11 is two-dimensionally scanned and the scanned points emit light. The emitted light enters the photosensor 12 passing by the mirror 14 and is converted to an electric signal.

By means of the read out X-ray image information obtained through the photosensor 12, a laser beam modulator of a photographic film recording device is controlled. In other words, by using a laser beam which is modulated by the X-ray image information read out by the above-described read-out device of this invention, the X-ray image is reproduced on a recording medium such as a photographic film.

Figure 2:
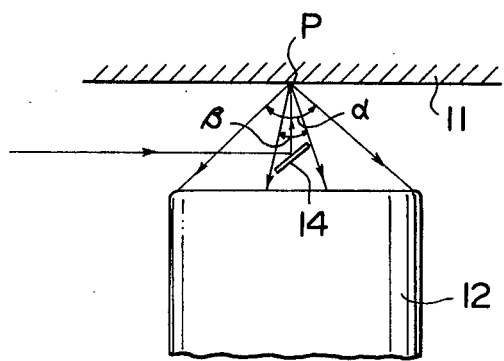
FIG. 2 is an enlarged partial front view showing the head of the photosensor employed in this embodiment.

FIG. 2 shows the solid angle viewing the light receiving face of the photosensor 12 cut by the mirror 14 and the solid angle thereof itself. The angle viewing the light receiving face of the photosensor 12 from a point P on the phosphor plate 11 is assumed to be $\alpha$ steradian, and the angle viewing the mirror 14 from the point P is assumed to be $\beta$ steradian. In this case, $\beta$ must be sufficiently smaller than $\alpha$ in order to improve the light collecting efficiency. The ratio $\beta/\alpha$ is preferred to be not more than 15%.

If the stimulating rays enter the photosensor 12 and is measured together with the light emitted by the phosphor plate 11, the S/N ratio is lowered. Therefore, it is necessary to distinguish the emitted light from the stimulating rays. In order to effect this, the wavelength of the stimulating rays is made different from that of the light emitted by the stimulated phosphor plate 11. For instance, a red laser beam having the wavelength of 600–700 nm is used as the stimulating rays and blue light having the wavelength of 300–500 nm is used as the light to be detected.

When the range of the spectroscopic distribution of the light emitted by the phosphor is large, a cut filter is used for narrowing the range of the spectroscopic distribution of the light received by the photosensor being distinguished from the stimulating rays. Or, the spectroscopic sensitivity of the photosensor is selected to be different or outside the range of the spectroscopic distribution of the stimulating rays.

Figure 3:
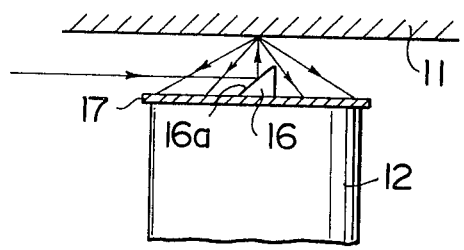
FIG. 3 is an enlarged partial front view showing the head of the photosensor employed in another embodiment.

FIG. 3 shows another embodiment of the device for measuring the light distinguishing the light emitted by the phosphor from the stimulating rays. As the reflector is used a triangular prism 16, which is fixed to the light receiving face of the photosensor 12. The reflection face of the prism 16 reflects the stimulating rays and transmits the light emitted by the phosphor plate 11 at the vaccum evaporated film 16a deposited thereon. With this film 16a, a large amount of light emitted by the phosphor 11 and introduced into the prism 16 is allowed to pass therethrough, which results in enhancement of the light collection.

As the photosensor 12 is used one which is sensitive only to the emitted light and non-sensitive to the stimulating rays. Or, a filter 17 is attached to the front face of the photosensor 12 so as to transmit only the emitted light into the photosensor 12.

Figure 4:
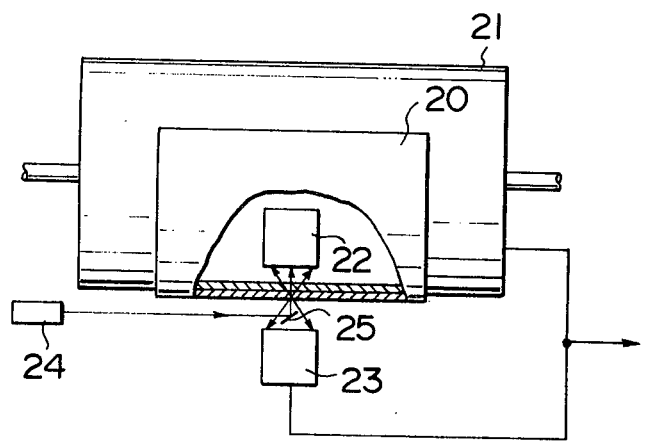
FIG. 4 is a front view showing another embodiment of the image read-out device in accordance with the present invention in which the emitted light is measured at both sides of the stimulable phosphor.

FIG. 4 shows an embodiment of the invention in which the emitted light from the stimulable phosphor is detected on both sides of the phosphor. A stimulable phosphor plate 20 is mounted on a drum 21. The stimulable phosphor plate 20 and the surface of the drum 21 are both transparent to the light emitted by the phosphor plate 20. Photosensors 22 and 23 are located inside and outside the drum 21. Between the outside photosensor 23 and the drum 21 is located a small reflector 25 for reflecting light from the laser source 24. In accordance with this embodiment, the light emitted inward is also collected and measured, and accordingly the light collecting efficiency is enhanced and the S/N ratio is improved.

Figure 5:
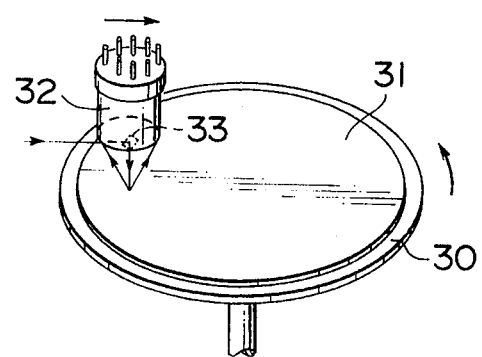
FIG. 5 is a perspective view showing another embodiment of the image read-out device in accordance with the present invention in which a stimulable phosphor is mounted on a disc.

FIG. 5 shows another embodiment in which the stimulable phosphor plate 31 is mounted on a disc 30. Above disc 30 is located a photosensor 32 with a mirror 33 provided therebetween. As the disc 30 rotates, the photosensor 32 and the mirror 33 are moved in the radial direction to scan the disc 30 in a spiral to read out the image information recorded thereon.

By use of the embodiment of the present invention as shown in FIG. 3, the following test was conducted. As the stimulable phosphor plate 11 was used a rectangular plate having a size of 30 cm × 30 cm. The stimulable phosphor applied thereon was BaFCl:Eu having a mean grain size of 10$\mu$. The BaFCl:Eu phosphor was applied on a substrate of cellulose triacetate by use of nitrocellulose in the thickness of 200$\mu$. As the laser beam source was used a He-Ne laser having output power of 10 mw. The wavelength of the stimulating rays was 633 nm.

As the photosensor 12 was used a 2 inch head-on type photomultiplier having a spectroscopic sensitivity of S-11 type. A filter 17 having transmittivity of 0.1% to the light of 633 nm and 80% to the light of 400 nm was provided in front of the photomultiplier.

The triangular prism 16 used had a side of 3 mm and was provided with on its inclined face a multi-layer coating which had reflectivity of 100% to the light of 633 nm and transmittivity of 85% to the light of 400 nm when the inclination angle was 45°.

The distance between the photosensor 12 and the surface of the stimulable phosphor plate 11 was 100 mm.

With the above-mentioned structure, about 70% of the light (in solid angle) of the light emitted by the phosphor plate 11 was collected. Further, since the stimulating rays were not measured by the photosensor 12, the S/N ratio was much improved. The S/N ratio was enhanced to more than twice as high as that of the prior art device.

It should be noted that the photosensor may not necessarily be the photomultiplier, but may be other type of photosensor like a silicon photodetector or a solar cell so long as it has a large light receiving area and can be located close to the phosphor plate.

Further, it should be noted that the X-ray image mentioned hereinbefore may not necessarily be an X-ray image but may be other kind of radiation image formed by use of other kind of radiation like $\alpha, \beta$, and $\gamma$-rays or ultraviolet rays.

We claim:

1. A radiation image read-out device for reading out radiation image information carried by the light emitted by a stimulable phosphor upon being stimulated with stimulating rays according to the image information recorded in the stimulable phosphor in advance by exposure to imagewise radiation, said image read-out device comprising a photosensor located close to a stimulable phosphor plate for detecting the light emitted by the stimulable phosphor plate upon stimulation with stimulating rays, and a reflecting optical element disposed between the photosensor and the stimulable phosphor plate for reflecting the stimulating rays advancing between the photosensor and the stimulable phosphor plate toward the stimulable phosphor plate, said reflecting optical element having a size small enough to allow most of the light emitted by the stimulable phosphor to be received by the photosensor.

2. A radiation image read-out device as defined in claim 1 wherein the solid angle viewing said reflecting optical element from a point on the stimulable phosphor plate is sufficiently smaller than the solid angle viewing the light receiving face of said photosensor from said point on the stimulable phosphor plate.

3. A radiation image read-out device as defined in claim 1 wherein the reflecting face of said reflecting optical element reflects the stimulating rays and transmits at least a part of the light emitted by the stimulable phosphor plate.

4. A radiation image read-out device as defined in claim 1 wherein said reflecting optical element is fixed to the light receiving face of said photosensor.

5. A radiation image read-out device as defined in claim 2 wherein said solid angle viewing said reflecting optical element from a paint on the stimulable phosphor plate is not more than 15% of said solid angle viewing the light receiving face of the photosensor from said point on the stimulable phosphor plate.

* * * * *